Patented May 22, 1951

2,553,992

UNITED STATES PATENT OFFICE 2,553,992

PURIFYING DEHYDROACETIC ACID BY DISTILLATION WITH GLYCOL COMPOUNDS

Glenn C. Wiggins and Wilbur E. Johnson, Midland, Mich., assignors to The Dow Chemical Company, Midland, Mich., a corporation of Delaware No Drawing. Application February 1, 1950, Serial No. 141,864

6 Claims. (Cl. 202—39)

The invention concerns a method of purifying dehydroacetic acid and particularly concerns the removal of difficultly separable impurities.

On of the methods of preparation of dehydroacetic acid, as described in U. S. Patent No. 2,229,204, is the polymerization of diketene at elevated temperatures in the presence of a polymerization catalyst in an inert solvent. The reaction is complete when no odor of diketene is detectable on final reflux. The reaction mixture may then be concentrated by distillation. The concentrate, upon cooling, precipitates dehydroacetic acid, which may be removed by filtration. Commercially, such a process yields a dehydroacetic acid that is somewhat colored and may contain from about 8 to 20 per cent of impurities. These impurities are comprised of low and high boiling substituted pyrones, tars, and coloring matter. Such impurities cannot be removed satisfactorily from the commerical grade of dehydroacetic acid by the usual purification methods, e. g., distillation or simple recrystallization. Attempted simple distillation results in sublimation and decomposition. These impurities in the commercial dehydroacetic acid tend to lower its melting point to about 104° C., as compared with 109° or higher for the purified material.

Since dehydroacetic acid may be used as a food preservative, as disclosed in U. S. Patent Nos. 2,474,226 to 2,474,229, inclusive, contamination thereof with impurities is undesirable. It is an object of the present invention to provide a simple and practicable method for separating dehydroacetic acid from its impurities.

To the accomplishment of the foregoing and related ends, the invention consists in the method hereinafter fully described and particularly pointed out in the claims.

The essential step of the present method consists in the co-distillation of the impure dehydroacetic acid with a compound selected from the group consisting of diethylene glycol, triethylene glycol, tripropylene glycol and the monoalkyl ethers of the latter two glycols which ethers have boiling points at atmospheric pressure between 235° and 280° C., and in which the alkyl group contains from 1 to 4 carbon atoms, inclusive. This is possible since the two compounds have similar boiling ranges. The mixture may be prepared by adding as little as one part, or as much as five parts by weight, of the glycol compound to one part of impure dehydroacetic acid, but the preferred ratio is about three parts of the glycol compound to one part of the acid.

The constituents of the mixture are then co-distilled at a temperature not exceeding 150° C. at a pressure of 15 mm. of mercury nor less than 60° C. at 1 mm. pressure. In practice, it is preferred to co-distill the mixture at a temperature of 100°–130° C. at an absolute pressure of about 4–7 mm. of mercury. Distillation under vacuum is continued until no more distillate is obtained within the above specified ranges of temperature and pressure. The distillate is cooled down with stirring to a temperature below room temperature. Purified dehydroacetic acid, which crystallizes out, may be separated by standard methods such as centrifuging, filtering, or decanting from the glycol compound. In practice, it is preferred to cool the distillate to a temperature of about 0°–20° C. with stirring, and then to filter off the crystallized dehydroacetic acid from the glycol compound. The dry acid thus obtained is a fairly pure grade of dehydroacetic acid. A very pure grade may be obtained by slurrying the filter cake of dehydroacetic acid with at least an equal weight of distilled water, filtering, and drying the filtered product free of moisture. The slurrying treatment aids in the removal of last traces of the glycol compound because the latter compound is much more soluble in water than is dehydroacetic acid. Comparable purity may be obtained by forming the sodium or potassium salt of dehydroacetic acid obtained from the original filter cake. To effect this result, the acid may be stirred with a slight excess of an aqueous solution of an alkali, such as sodium carbonate. Sufficient water is added to insure complete solution of the alkali-metal salt of dehydroacetic acid at about room temperature. The solution is acidified until all the dehydroacetic acid has been re-precipitated. The white product, after being filtered, washed and dried, has a melting point of 109.5°–111.5° C. This agrees with the melting points recorded in the art for pure dehydroacetic acid.

After the initial co-distillation, the still usually contains a small residue of dehydroacetic acid, some of the glycol compound, and most of the original impurities. This residue may be added to the next batch of dehydroacetic acid and glycol compound to be distilled. By using this technique, there is observed a minimum loss of dehydroacetic acid over a large number of distillation runs.

The following examples will serve to illustrate the practice of the invention. It is to be understood, however, that the scope of the invention is not to be regarded as limited thereby.

Example 1

To 432 grams of tri-propylene glycol monomethyl ether, there was added 141 grams of an impure commercial grade of dehydroacetic acid (containing about 20 per cent impurities), and the mixture was co-distilled under vacuum. Distillation proceeded at a temperature of 118° C. with a pressure of about 5-7 mm. of mercury until 530 grams of distillate had been collected. The distillate was warmed to 85° C. and then cooled to 15° C. whereupon white crystals of dehydroacetic acid came out of solution. These were filtered off and suction was continued until most of the tri-propylene glycol monomethyl ether had been separated from the crystals. The crystals of dehydroacetic acid were then slurried for several minutes with 200 grams of distilled water, and the slurry was filtered. The crystals were washed with water and then dried for about 5 hours at 50°-60° C. A yield of 104 grams of pure dehydroacetic acid was obtained from the impure commercial grade. The pure product had a melting point of 109°-110.5° C. The amount so-recovered represented about 92 per cent of the amount of dehydroacetic acid in the original charge of crude product. The bulk of the dehydroacetic acid represented in the 8 per cent loss is recoverable from the residue remaining behind after the distillation. This is accomplished by adding the residue to the next batch of commercial dehydroacetic acid and tri-propylene glycol monomethyl ether to be distilled.

Instead of slurrying the filter cake of dehydroacetic acid, as obtained above in the filtration of the cold distillate, a 168 gram cake of dehydroacetic acid, containing a small adsorbed amount of tri-propylene glycol monomethyl ether was added to 53 grams of sodium carbonate in 400 grams of water. After complete solution had been effected, part of it was acidified with hydrochloric acid. The precipitated dehydroacetic acid was filtered, washed with water, and dried. The white crystals obtained in this manner melted at 109.5°-111.5° C.

Example 2

To 798 grams of tri-propylene glycol n-butyl ether, there was added 266 grams of an impure commercial grade of dehydroacetic acid and the mixture was co-distilled under vacuum until no more distillate was obtained. Distillation proceeded at a temperature of 124°-125° C. with a pressure of about 6-7 mm. of mercury. The distillate was cooled and the crystals of dehydroacetic acid were filtered off. The filtrate contained some dehydroacetic acid dissolved in the tri-propylene glycol n-butyl ether. About 300 grams of water were added to this filtrate and the mixture acidified to a pH of 1. Crystallization of dehydroacetic acid occurred, and these white crystals were filtered and dried. They had a melting point of 109° C.

Example 3

To 437 grams of tri-propylene glycol isopropyl ether, there was added 146 grams of an impure commercial grade of dehydroacetic acid (about 92 per cent purity) and the mixture was co-distilled under vacuum until no more distillate was obtained. Distillation proceeded at a temperature of about 103°-104° C. with a pressure of about 5 mm. of mercury. The distillate was taken up in 1900 grams of water and 45 grams of sodium carbonate. The entire mixture was acidified to a pH of 2. Dehydroacetic acid crystallized out. The crystals were filtered, slurried with cold water, and filtered again. The product was dried at 58° C. for 6 hours. About 117 grams of snow-white dehydroacetic acid, melting at 110° C., was recovered.

Example 4

To 230 grams of tri-ethylene glycol, there was added 100 grams of an impure commercial grade of dehydroacetic acid and the mixture was co-distilled under vacuum until no more distillate was obtained. Distillation proceeded at a temperature of 130° C. with a pressure of about 6-7 mm. of mercury. The distillate was cooled to about 0° C. and the crystals of dehydroacetic acid were filtered off. The crystals were slurried in 200 grams of water and filtered again. These crystals were dried at 50° C. for about 16 hours. A yield of 79 grams of snow-white dehydroacetic acid, melting at 109° C., was obtained.

The examples have illustrated the use of tri-ethylene glycol, and the methyl, n-butyl and isopropyl monoethers of tri-propylene glycol. Among other glycol compounds which may be used are:

| | B. P., ° C. |
|---|---|
| Diethylene glycol | 246 |
| Tri-ethylene glycol monomethyl ether | 249 |
| Tri-ethylene glycol monoethyl ether | 248 |
| Tri-propylene glycol monoethyl ether | 252 |
| Tri-propylene glycol mono-n-propyl ether | 263 |
| Tri-propylene glycol mono-isobutyl ether | 265 |
| Tri-propylene glycol mono-sec. butyl ether | 235 |

The ratio of dehydroacetic acid to the glycol compound employed will vary in the distillates obtained, depending on which compound is used, and the viscosity of the glycol compound will be found to affect the ease of recovery of the dehydroacetic acid from the distillate by simple filtration, but, since all of the useful glycol compounds have a considerable solubility in water, and dehydroacetic acid is only very slightly soluble in water, methods of recovery other than simple filtration are readily available.

After dehydroacetic acid has been separated from the difficultly removable impurities by the present method of co-distillation, and the glycol compound has been separated from the dehydroacetic acid, the recovery of the pure dehydroacetic acid from remaining glycol compound may be practiced in many ways. Some of these methods have been described above. Other methods for recovering the dehydroacetic acid from the distillate will suggest themselves to those skilled in the art, and are intended to fall within the meaning of the term "recovering dehydroacetic acid," as used in the appended claims.

We claim:

1. The method of separating dehydroacetic acid from difficultly removable impurities which comprises co-distilling a mixture consisting of impure dehydroacetic acid and a glycol compound selected from the class consisting of di-ethylene glycol, tri-ethylene glycol, tri-propylene glycol and the mono-alkyl ethers of the latter two glycols which ethers have boiling points at atmospheric pressure between 235° and 280° C. and in which the etherifying alkyl group has from 1 to 4 carbon atoms, inclusive, there being initially from 1 to 5 parts by weight of the glycol compound for each part of the dehydroacetic acid, maintaining the distillation temperature in the range from 60° C. at 1 mm. pressure to 150° C. at 15 mm. pressure, cooling the distillate to a crystallization temperature until the dehydroacetic acid crystallizes therefrom, and recovering dehydroacetic acid from the glycol compound.

2. The method as claimed in claim 1 wherein the glycol compound employed is tri-propylene glycol.

3. The method as claimed in claim 1 wherein the glycol compound employed is tri-propylene glycol mono-methyl ether.

4. The method as claimed in claim 1 wherein the glycol compound employed is tri-propylene glycol mono-isopropyl ether.

5. The method as claimed in claim 1 wherein the glycol compound employed is tri-propylene glycol mono-n-butyl ether.

6. The method as claimed in claim 1 wherein the glycol compound employed is triethylene glycol.

GLENN C. WIGGINS.
WILBUR E. JOHNSON.

REFERENCES CITED

The following references are of record in the file of this patent:

UNITED STATES PATENTS

| Number | Name | Date |
|---|---|---|
| 2,229,204 | Boese | Jan. 21, 1941 |

OTHER REFERENCES

Organic Synthesis, vol. 20, pp. 26–29, 1950.